(12) United States Patent
Takiguchi

(10) Patent No.: US 7,128,387 B2
(45) Date of Patent: Oct. 31, 2006

(54) DROPLET DISCHARGING DEVICE AND MANUFACTURING METHOD OF MICROCAPSULE

(75) Inventor: Hiroshi Takiguchi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 355 days.

(21) Appl. No.: 10/791,809

(22) Filed: Mar. 4, 2004

(65) Prior Publication Data

US 2004/0189734 A1 Sep. 30, 2004

(30) Foreign Application Priority Data

Mar. 28, 2003 (JP) .............................. 2003-092364

(51) Int. Cl.
*B41J 2/015* (2006.01)
(52) U.S. Cl. ........................................................ 347/20
(58) Field of Classification Search .................. 347/47, 347/48, 21, 70, 74; 424/490; 425/5, 6, 456; 264/7, 9
See application file for complete search history.

(56) References Cited

U.S. PATENT DOCUMENTS 4,251,195 A  2/1981 Suzuki et al.
4,302,166 A  11/1981 Hatcher et al.
4,692,284 A  9/1987 Braden
6,377,387 B1  4/2002 Duthaler et al.

FOREIGN PATENT DOCUMENTS

| DE | 100 24 154 A 1 | 11/2001 |
|---|---|---|
| EP | 0 367 142 A | 5/1990 |
| FR | 2 660 212 A | 10/1991 |
| JP | A 59-228930 | 12/1984 |
| JP | A 5-285375 | 11/1993 |
| JP | A 7-96167 | 4/1995 |
| WO | WO 00/59625 | 10/2000 |
| WO | WO 02/13786 | 2/2002 |

*Primary Examiner*—Shih-wen Hsieh
(74) *Attorney, Agent, or Firm*—Oliff & Berridge, PLC

(57) ABSTRACT

Provided is a droplet discharging device (1) enabling the manufacture and discharge of microcapsules. A solution (16) containing the core material and shell material of the microcapsule is temporarily stored within a discharge tank (11) to which is disposed the oscillating body (12) of the droplet discharging device(1), and microcapsules are formed within the solution by oscillating the oscillating body (12) at a high frequency f1 and levigating the core material. Thereafter, the oscillating body (12) is operated at a relatively low frequency f2 in which the solution is able to respond, the solution is pushed outside from the tank (11), small amounts of the solution containing the microcapsule are discharged from the discharge nozzle (13), and microcapsules are applied to the target body.

11 Claims, 5 Drawing Sheets

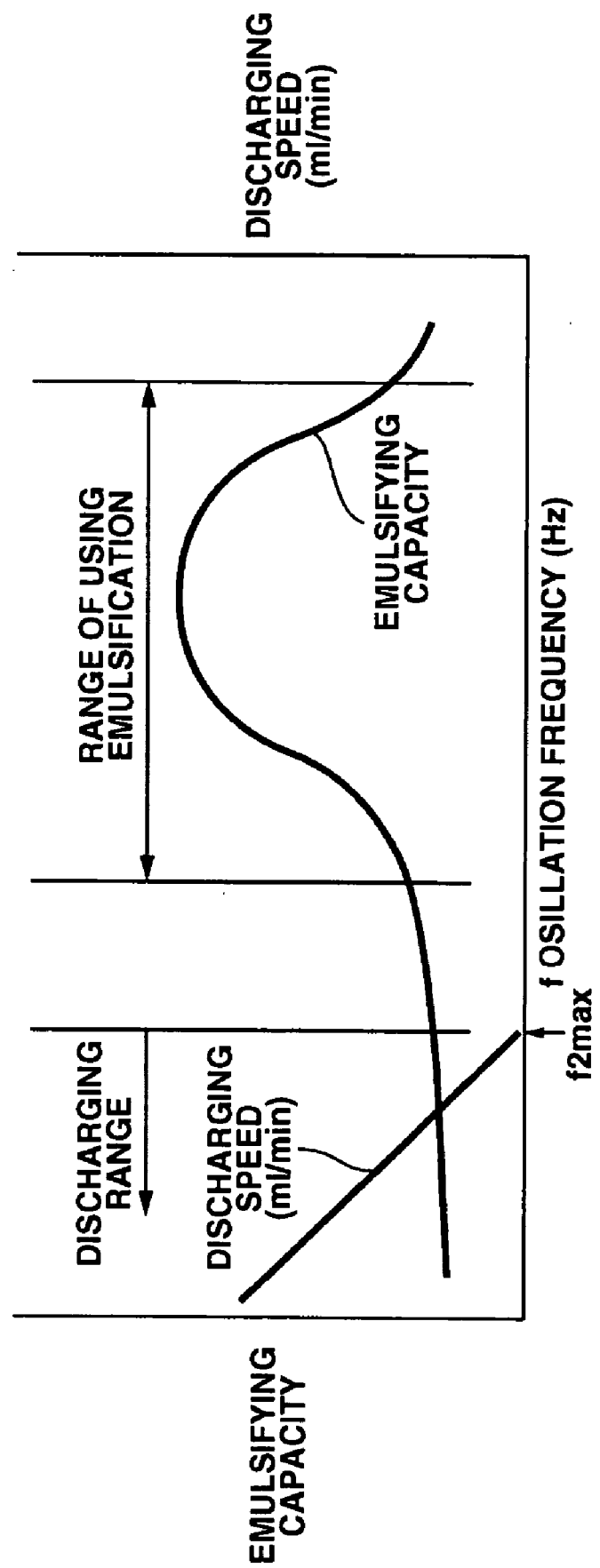

DROPLET DISCHARGING DEVICE AND MANUFACTURING METHOD OF MICROCAPSULE

BACKGROUND OF THE INVENTION

1. Field of the Invention

The present invention generally relates to droplet discharging technology for discharging minute amounts of droplets, and in particular to a droplet discharging device capable of microencapsulating and discharging the object to be discharged (droplet), and to a manufacturing method of microcapsules.

2. Description of the Related Art

A microcapsule is generally composed of a content referred to as the core material, and a shell material which is a minute container for encapsulating this core material. Since a microcapsule possesses a function of protecting the core material from external environment and a function of adjusting the timing of being discharged to the outside, it is being used in a variety of fields such as pharmaceutical products, impact paper, aromatic substances, electrophoresis and so on.

This microcapsule is generally manufactured via the step of dispersing the core material into particulates in a suitable medium, and the step of coating such particles with the shell material. The ultrasonic wave method, homogenizer method, spray drying method or the like is employed for the levigation and micro-encapsulation of the core material.

For example, Japanese Patent Laid-Open Publication No. H05-285375 discloses an example of an ultrasonic wave method. In this example, employed is a probe device for generating ultrasonic waves from the tip of a metal probe composed of titanium or the like. The probe is dipped in a liquid containing keratin S-sulfur salt solution, organic solvent, core material and so on, and then subject to vibrational energy, whereby obtained is a microcapsule.

Further, for instance, Japanese Patent Laid-Open Publication No. H07-96167 discloses an example of the homogenizer method. In this example, while supplying an aqueous substance and hydrophobic substance, these are emulsified and dispersed with the high-speed rotation of a rotor, and the hydrophobic substance is thereby microencapsulated.

Nevertheless, the manufacture and use of microcapsules are estranged either in terms of time or space. A typical example of this would be when the place of manufacture and the place of use of such microcapsules differ, and this estrangement in terms of time or space leads to the deterioration in quality of the microcapsules. Appropriate storage and transport of the microcapsules will also become necessary.

Moreover, since a conventional manufacturing device of microcapsules adjusts the particle size of microcapsules via stirring, it is necessary to fill the microcapsule materials in the stirring container in an amount in which the stirring bar of the stirring mechanism will become buried to a certain degree. Thus, this is not suitable for production of microcapsules in slight or minute amounts. For example, since DNA fragment samples for forming a so-called DNA sensor (or DNA chip), medical drugs for testing and so on are extremely costly, problems will arise when these are to be microencapsulated.

In addition, a conventional manufacturing device of microcapsules is for producing one type in large amounts, and, when various microcapsules in which the particle size and core material selected arbitrarily are to be produced in minute amounts, the production efficiency is low.

Further, with a conventional manufacturing device of microcapsules, it is difficult to stir the material evenly, and distribution of the particle size of the manufactured microcapsules is broad. As a result, the nozzle hole of the droplet discharging device may clog up when applying the microcapsules with the droplet discharging method.

SUMMARY OF THE INVENTION

Accordingly, an object of the present invention is to provide a manufacturing method and manufacturing device of microcapsules suitable in manufacturing minute amounts of microcapsules.

Further, another object of the present invention is to provide a manufacturing method and manufacturing device of microcapsules that do not require the accumulation and storage of microcapsules by sequencing the manufacture and use of microcapsules.

Moreover, a further object of the present invention is to provide a droplet discharging device for manufacturing microcapsules and discharging such microcapsules to a desired position.

In order to achieve the foregoing objects, the present invention provides a droplet discharging device for discharging minute amounts of droplets containing a microcapsule composed from a minute core and a shell covering the core, comprising: a tank for storing a solution containing the core material and shell material of the microcapsule; and one or a plurality of oscillating bodies for applying vibrational energy to the core material within the tank and emulsifying the core material, and promoting the microencapsulation with the shell material.

According to the foregoing structure, microcapsules can be manufactured within the droplet discharging device, and the manufactured microcapsules can be stored within the droplet discharging device without any impurities getting mixed in or deterioration in quality.

Preferably, the tank is disposed in the vicinity of a droplet discharging hole, and the oscillating body assumes the process of microencapsulating the core material and the process of discharging droplets containing this microcapsule from the discharging hole.

According to the foregoing structure, discharge of the microcapsules will be possible subsequent to the microencapsulation of the core material with the oscillating body. The temporal isolation of the manufacture and use of microcapsules can be avoided as much as possible, and discharge of microcapsules will be enabled while maintaining the quality thereof.

Preferably, the oscillating body generates a first vibrational energy of a first frequency corresponding to the particle size of the microcapsule to be formed, and a second vibrational energy of a second frequency lower than the first frequency for discharging droplets containing the microcapsule from the discharging hole. As a result of switching the frequency of the oscillating body having the foregoing structure, the manufacture and discharge of microcapsules can be selectively implemented within the same tank.

Preferably, the tank is disposed in the vicinity of a droplet discharging hole, one of the oscillating bodies generates a first vibrational energy with a first frequency corresponding to the particle size of the microcapsule to be formed, and one of the other oscillating bodies generates a second vibrational energy with a second frequency lower than the first frequency for discharging droplets containing the microcapsule from the discharging hole.

As described above, since two oscillating bodies having different frequencies are provided, the manufacture and discharge of microcapsules can be selectively implemented within the same tank merely by the on/off of the power source of the respective oscillating bodies.

Preferably, the oscillating body includes at least one among a piezoelectric material, an oscillating body driven by electrostatic force, or a micromotor. According to the foregoing structure, by foremost applying a prescribed electrical frequency signal to the piezoelectric material, or an oscillating body driven by electrostatic force, a desired processing between the manufacture and discharge of microcapsules may be performed within the foregoing tank. Further, the micromotor will operate the stirring bar such as a screw provided within the tank. As a result, the manufacture of microcapsules can be conducted efficiently.

Preferably, the first frequency is an ultrasonic frequency of an inaudible range. As a result, when the oscillating body is used in a high frequency range of an ultrasonic wave, fine decentralization and emulsification between liquid phases of two phases or more will become possible with the significant vibrational energy. In other words, this is suitable for forming minute microcapsules. Moreover, since this is an inaudible range, oscillation noise cannot be heard, and there is an advantage in that it will be quiet. Further, this may also be used for the ultrasonic cleansing within the tank prior to replacing the solution within the tank with a different type of liquid. In addition, this ultrasonic cleansing may also be used for removing the clogging within narrow holes such as the discharging hole nozzle, solution injection tube, and so on.

Incidentally, the droplets containing the microcapsule are not able to move along the liquid flow path from the tank to the droplet discharging hole with the first vibrational energy of the first frequency, and the droplets are able to move along the liquid flow path with the second vibrational energy of the second frequency. As a result, with the vibrational amplitude of the liquid resulting from the first frequency, the liquid within the tank may be stored stably without any leaks, and, with the vibrationial amplitude of the liquid resulting from the second frequency, the liquid within the tank may be discharged stably. Accordingly, the precision and reliability upon selecting and implementing the manufacture or discharge of microcapsules will improve.

Preferably, cooling means is provided to the oscillating body or the tank. When the oscillating body oscillates, particularly in an ultrasonic range, the temperature within the oscillating body and tank may rise. By cooling this with the cooling means, materials that do not favor being exposed to high temperatures may also be used. Further, since temperature adjustment during the manufacture of microcapsules can also be conducted with the cooling means, the finalized type and quality of the microcapsules to be determined with the manufacturing temperature can also be adjusted.

Preferably, the tank is a compression chamber. As a result, the compression chamber for applying pressure to the liquid to be the object of discharge from the droplet discharging device can be utilized as the manufacturing container of microcapsules, and the simplification of the device structure will be enabled thereby.

Preferably, negative pressure adjustment means for setting the negative pressure within the tank is provided to the tank, and the negative pressure is raised or lowered in the micro-encapsulation process and the discharging process. By raising the negative pressure within the tank in the micro-encapsulation process, it will be possible to prevent the leakage of the solution within the tank from the nozzle caused by the application of high vibrational energy. Further, by relatively lowering the negative pressure within the tank during the discharging process, such discharging will be promoted.

Moreover, the present invention also provides a droplet discharging device for discharging minute amounts of droplets containing a microcapsule composed from a minute core and a shell covering the core, comprising: a first tank for storing a solution containing the core material and shell material of the microcapsule; means for applying levigation energy to the core material within the tank and levigating the core material, and promoting the micro-encapsulation with the shell material; a second tank for storing the solution containing the generated microcapsules; and an oscillating body for discharging the solution stored in the second tank outside from a droplet discharging hole.

According to the foregoing structure, since the first tank will assume the process of manufacturing microcapsules and the second tank will assume the process of discharging microcapsules, respectively, the manufacture and discharge of microcapsules can be carried out simultaneously. Wasted time (waiting time of micro-encapsulation, waiting time for discharge) can be reduced to enable continuous discharging. As a result of comprising the first and second tanks separately, optimum tank conditions for micro-encapsulation and discharging of droplets can be set independently. Further, since the second tank is for discharging only, there is no need to apply oscillation other than at the timing of discharging, and the margin in relation to leakage will be improved thereby.

Moreover, the present invention also provides a manufacturing method of a microcapsule employing a droplet discharging device comprising a compressing chamber capable of temporarily storing a solution, and an oscillating body for applying pressure to this solution and moving it outside from the compression chamber, comprising: a solution storing step for storing in the compression chamber a solution containing a core material to become the core of the microcapsule, a shell material to become the wall, and a solvent; a micro-encapsulation step for promoting the micronization of the core material within the compression chamber by generating in the oscillating body a vibrational energy of a frequency higher than the oscillation frequency for moving the solution outside, and generating a microcapsule in which the core material is encapsulated with the shell material; and a discharging step for generating in the oscillating body a vibrational energy of the oscillation frequency for discharging the solution outside, and discharging the solution containing the microcapsule outside from the compression chamber.

According to the foregoing manufacturing method, by applying vibrational energy of the micro-encapsulation process to the minute solution containing a core material and shell material and the solvents thereof within the tank of the droplet discharging device, the core material will be subject to micronization and decentralization as a result of the vibrational energy being applied thereto, and the decentralization and emulsification of the solvent (including at least an aqueous solvent or oily solvent) will be promoted. And, as a result of incorporating the core material in the minute droplet of the aqueous solvent, and encapsulating the periphery of the minute droplets of the aqueous solvent in which the core material has been incorporated therein with a shell material, microcapsules may be formed. Moreover, these microcapsules may also be discharged.

Preferably, the particle size of the microcapsule is set by adjusting the frequency and vibrational energy of the oscillating body.

The degree of decentralization and emulsification between the aqueous solvent and oily solvent; that is, the size of the decentralized and emulsified minute droplets corresponds to the frequency and vibrational energy status of the oscillating body. Thus, as a result of the shell material for covering the periphery of the minute droplets being solidified, the particle size of the microcapsule to be ultimately formed can be set.

Further, the present invention also provides a manufacturing method of a microcapsule employing a droplet discharging device for discharging minute amounts of droplets containing a microcapsule composed from a minute core and a wall encapsulating the core, comprising: a first step for storing in a first tank a solution containing a core material and shell material of the microcapsule; a second step for applying levigation energy to the core material within the first tank with levigation energy application means and levigating the core material, and promoting the micro-encapsulation with the shell material; a third step for storing in a second tank a solution containing the generated microcapsule; and a fourth step for pressurizing the solution stored in the second tank with an oscillating body and discharging the solution outside from a droplet discharging hole.

According to the foregoing manufacturing method, by applying vibrational energy of the micro-encapsulation process to the solution containing at least a core material and a shell material and the solvents thereof (including an aqueous solvent and oily solvent) within the first tank, the core material will be subject to micronization and decentralization as a result of the vibrational energy being applied thereto, and the decentralization and emulsification of the aqueous solvent and the oily solvent will be promoted. And, as a result of incorporating the core material in the minute droplet of the aqueous solvent, and encapsulating the periphery of the minute droplets of the aqueous solvent in which the core material has been incorporated therein with a shell material, microcapsules may be formed. Moreover, these microcapsules may also be discharged from the second tank.

As described above, the manufacturing process of microcapsules and the discharging process of microcapsules may be performed simultaneously, and the time required for applying microcapsules to the target body may be shortened.

In addition, since the first tank will assume the process of manufacturing microcapsules exclusively, and the second tank will assume the process of discharging microcapsules exclusively, optimum conditions can be set independently for each tank. Further, since the second tank is for discharging only, there is no need to apply oscillation other than at the timing of discharging, and the margin in relation to leakage will be improved thereby.

Preferably, the levigation energy application means employs an oscillating body, and the particle size of the microcapsule is set by adjusting the frequency and vibrational energy of the oscillating body. As a result, the particle size of microcapsules can be controlled.

BRIEF DESCRIPTION OF THE DRAWINGS

FIG. 5 is a graph showing the oscillation frequency of the oscillation body, emulsifying capacity, and amount of liquid discharged from the discharging hole according to the present invention.

DETAILED DESCRIPTION OF THE PREFERRED EMBODIMENTS

The droplet discharging device and manufacturing method of microcapsules according to the present invention are now explained in detail with reference to the attached drawings.

An embodiment of the present invention is characterized in that the manufacture of microcapsules composed from a minute core and a shell for covering this core is performed in a droplet discharging device for discharging minute amount of droplets. In a preferable embodiment, an oscillating body is mounted on a droplet discharging tank of the droplet discharging device, and, by changing the frequency of the oscillating body, the manufacture and discharge of microcapsules may be selectively performed. In the foregoing case, there is a case where one oscillating body is provided inside one tank, and a case where two (a plurality on oscillating bodies are provided. The respective oscillating bodies are operated in an appropriate mode of manufacture and discharge of microcapsules.

In another preferable embodiment, two (a plurality on tanks are used inside the droplet discharging device. An oscillating body for manufacturing microcapsules is provided to one tank (tank for manufacturing microcapsules), and an oscillating body for discharging is provided to the other tank (tank for discharging droplets). As a result of employing the foregoing structure, the manufacture and discharge of microcapsules can be conducted simultaneously.

Since the microcapsules manufactured inside the droplet discharging device are immediately discharged to a desired position so as to form a coating or the like, there is no need to store the microcapsules, and deterioration in quality due to the storage time or contact with air or the like can be prevented. Further, this is also suitable for the manufacture of small amounts of microcapsules.

(First Embodiment)

Figure 1:
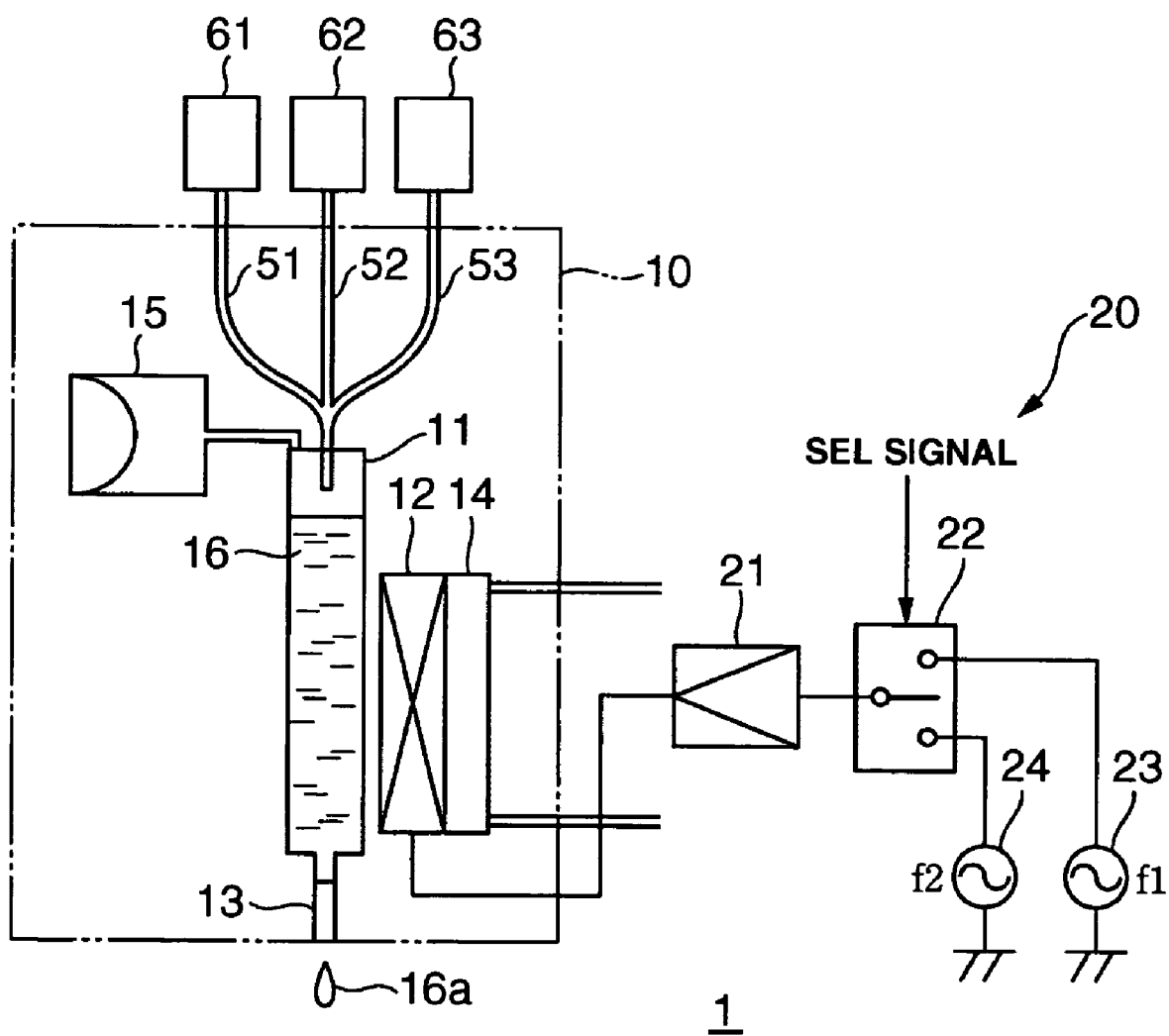
FIG. 1 is an explanatory diagram showing the droplet discharging device according to the first embodiment of the present invention.

FIG. 1 is an explanatory diagram for explaining the droplet discharging device according to the first embodiment of the present invention.

As illustrated in FIG. 1, the droplet discharging device 1 is composed of a droplet discharging unit 10, a drive power generation unit 20, cartridge tanks 61 to 63, and so on. The droplet discharging unit 10 is mounted on a carriage not shown and is movable relatively in relation to the object to be discharged (not shown). The droplet discharging unit 10 is able to move with a high degree of precision to a desired discharging spot just like when a inkjet printer head performs a scan.

The droplet discharging unit 10 includes a lower-capacity tank 11, an oscillating body 12 disposed on the side wall of the tank and which generates vibrational energy, a discharging hole 13 for discharging droplets outside from the tank 11, a cooling means (set-up) 14 for cooling the oscillating body and preventing the rise in temperature of the solution within the tank, a negative pressure adjustment means 15 for suitably adjusting the negative pressure within the tank 11 and preventing leakage, among other components.

Microcapsule materials are supplied from detachable cartridge tanks 61 to 63 to the tank 11 via liquid flow paths 51 to 53, respectively. The oscillating body 12, for example, corresponds to a piezo (piezoelectric) element such as PZT, a magnetostrictive oscillator, an oscillator composed of a diaphragm driven by electrostatic force, micromotor oscillator and the like, and converts the supplied drive signal into vibrational energy. The oscillating body 12 is able to generate a relatively high frequency f1 (e.g., ultrasonic wave) as the micro-encapsulation frequency, and a relatively low frequency f2 as the discharge frequency. The oscillating body 12 may be employed in various constitutions; for instance, a type that is fixed to the outer wall of the tank 11 and which oscillates the wall, a type in which the wall of the tank 11 itself becomes an oscillation wall, a type in which a part of the wall portion of the tank 11 itself becomes the oscillating body, a type that exposes an oscillator within the tank 11, and so on.

The discharging hole 13 has a path length which allows the discharge of the solution 16 containing microcapsules outside as droplets 16a when the oscillating body 12 oscillates the wall surface of the tank 11 with the discharge frequency, and prevents the discharge of the solution 16 outside when the oscillating body 12 oscillates the wall surface with the micro-encapsulation frequency so as to apply impact energy to the solution 16 for emulsification or the like.

The cooling unit 14 is composed from an air-cooling structure, a water (liquid) cooling structure, a peltiert device or the like, and cools the oscillating body 12. The cooling unit 14 prevents the thermal destruction of the oscillating body and prevents the rise in the temperature of the solution within the tank caused by the oscillating body 12. As a result, deterioration of the solution, deterioration of microcapsules, destruction of capsules and so on may be prevented. In particular, this enables the micro-encapsulation of protein, biological samples, DNA fragments and the like that employ agents vulnerable to heat. The negative pressure adjustment means 15 comprises an elastic diaphragm such as rubber, and generates negative pressure via aspiration within the tank 11 with the restoration force thereof. This negative pressure is adjustable. For instance, this may be suitably adjusted with a control device not shown in correspondence with the operation mode or in correspondence with the amount of remaining solution. For example, with the adjustment corresponding to the operation mode, adjustment is set separately in the micro-encapsulation stage and the droplet discharging stage, thereby preventing leakage from the nozzle.

The drive power generation unit 20 comprises an oscillator 23 for generating a first signal of the frequency f1, an oscillator 24 for generating the second signal of the frequency f2, a selection switch 22 for selecting these signals in accordance with the selection command signal, a power amplifier 21 for power (electrical power) amplifying the selected frequency signal and supplying this to the oscillating body 12, among other components. By supplying to the oscillating body the drive signal of the first frequency or second frequency in accordance with the selection command, the oscillating body 12 may be operated in a micro-encapsulation mode and a discharge mode.

In the foregoing structure, microcapsule materials 16 are introduced into the tank 11 from the likes of a cartridge tank 61. The oscillating body 12 is operated at a prescribed power, frequency f1 and for a prescribed period of time so as to form microcapsules inside the tank 11. Next, the droplet discharging unit 10 is transported with the likes of a carriage not shown and set to the discharging position, the oscillating body 12 is pulse-driven at frequency f2, which is a frequency relatively lower than frequency f1, and the minute droplets 16a containing the microcapsules are discharged from the nozzle 13 toward the target body. Control of the discharging position and patterning of application may employ, for instance, the publicly known inkjet printer technology.

Next, micro-encapsulation in the foregoing embodiment is explained with reference to FIG. 4.

The tank 11 stores the core material 31 and shell material 32 of the microcapsule, the aqueous solvent 33, and the oily solvent 34. Decentralization, emulsification, covering and micro-encapsulation are performed to these materials with the oscillating body 12.

Foremost, the stages of decentralization and emulsification are explained with reference to FIG. 4(*a*). Oscillation of the oscillation frequency f1 is applied to the mixed solution within the tank 11 in which the aqueous solvent 33 with the core material 31 is mixed therein and the oily solvent 34 with the shell material 32 is mixed therein. Since this oscillation frequency is an ultrasonic wave in an inaudible range, powerful energy is applied to the mixed solution. Since this is a high oscillation frequency, fine separation; that is, decentralization of the molecule clusters of the aqueous solvent in the oily solvent will progress (emulsification). Here, the core material has affinity, and is incorporated into the minute clusters (minute droplets) of the aqueous solvent 33.

Figure 4:
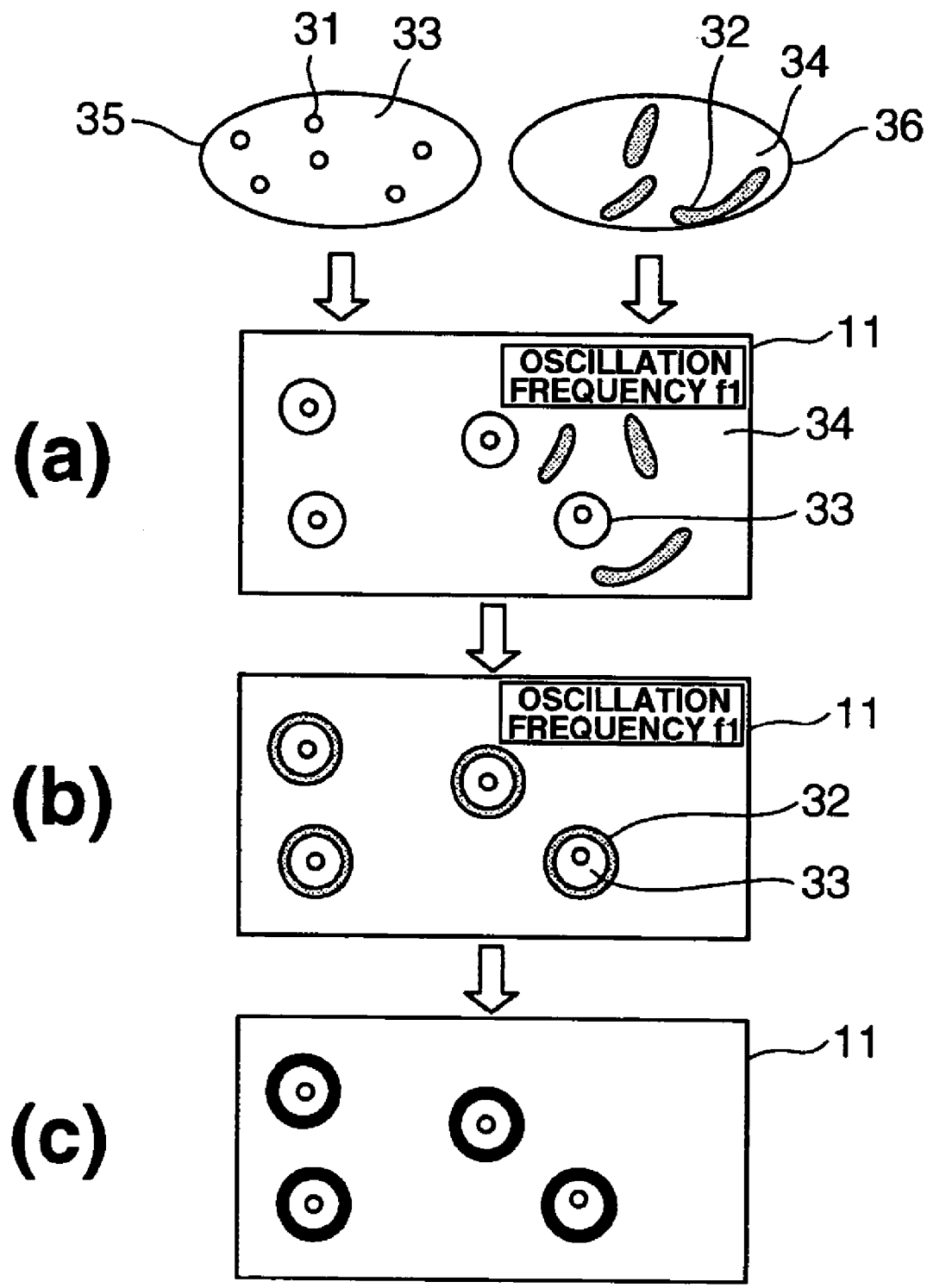
FIG. 4 is a diagram showing the manufacturing method of microcapsules within the droplet discharging device according to the first embodiment of the present invention.

Next, as shown in FIG. 4(*b*), covering with the shell material progresses. The shell material 32 mixed into the oily solvent 34 becomes unstable, starts to precipitate at the interface of the oily solvent and aqueous solvent. The principle of this precipitation is based on the fact that segregation state is a potential minimum state of the surface tension at the interface between two phases for this shell material. As a result, the shell material 32 adheres to the peripheral interface of the minute droplets of the aqueous solution 33 and covering process accomplished thereby.

Next, as shown in FIG. 4(*c*), the micro-encapsulation process progresses. The aggregate of the segregated shell material 32 described above will be subject to polymerization reaction, become a somewhat chemically stable shell, and microcapsules will be formed thereby. Further, a polymerization reaction promoter may also be mixed therein so as to promote the polymerization reaction.

In the example of the micro-encapsulation described above, although the shell material was mixed only in the oily solvent, micro-encapsulation employing a lower-capacity tank and oscillating body is not limited thereto.

For example, a shell material inside the oily solvent and different type of shell material inside the aqueous solvent may segregate simultaneously at the peripheral boundary face of the minute droplets, polycondensation reaction between these two types of shell materials will progress, and stable microcapsules may be formed thereby. Specifically, there is an example where polycondensation reaction will occur between the hexamethylenediamine inside the aqueous solvent and the sebacoyldichloride inside the oily solvent, and nylon is generated thereby.

Further, as another specific example of manufacturing microcapsules, the manufacturing conditions of the coacervation method are described below.

After adding 10 ml of pyrene toluene solution (0.0081 mol/dm$^3$) to 20 ml of gum arabic (1 g) aqueous solution (0.026 mol), 120 ml of melamine (0.0095 mol) and formaldehyde (0.026 mol) aqueous solution is added thereto, phosphoric acid is used to make this roughly pH4 to 5, and, thereafter, this is stirred strongly with the oscillating body inside the lower-capacity tank of the inkjet nozzle unit. While adding ammonium sulfate (0.0011 mol) to this solution and maintaining a temperature of 65° C. while stirring this strongly with a stirring bar and carrying out the reaction for roughly 2 hours, microcapsules could be obtained.

Next, principle of the emulsification phenomenon and particle size control is now explained. Electrical energy amplified with a prescribed frequency is converted into a mechanical vibration with an electromechanical converter, and this is conveyed to the oscillator. When the tip of the oscillator is immersed in the solution, the mechanical vibration becomes pressure, and generates ultrasonic cavitation. Cavitation is a phenomena of implosion of countless number of air bubbles which was formed under the local pressure drop within the solutions. The implosion of these tiny micro bubbles produces short-lived (lasting microseconds) "hot spots" in the liquid that can release sufficient impact for emulsification to the solvent consecutively. Thus, the energy of emulsification used for tearing the particles will be able to control by the electrical energy supplied to the oscillating body. When the oscillation frequency is raised, energy supplied per time will increase, and the particle size will become smaller due to the high impact energy. Emulsification of the desired particle size is enabled by suitably controlling this oscillation frequency, amplitude and oscillating time. The emulsification capacity with ultrasonic waves employing a lower-capacity tank within the droplet discharging head was confirmed as follows.

[Experimental Conditions]
Mixing conditions: 0.5 ml of nonpolar detergent was mixed with a solution in which water/dodecane=10/1.
Ultrasonic cleaner: The oscillating body employed was a PZT (piezo element), and a free-running oscillator method was adopted. Temperature employed was room temperature, oscillation frequency was 38 kHZ, and the oscillation application time was 4 min.

[Experimental Results]
Although the water/dodecane solution will not be emulsified even when oscillated with standard ultrasonic oscillation, emulsification can be realized by adding a nonpolar surface-active agent. Ultrasonic waves were generated with the oscillator of 38MHz for emulsification, and, when oscillation was applied, an even emulsified state could be obtained. The particle size (diameter of droplet) of the dodecane, which is the emulsified oil droplet, was 3 μm at maximum, and Brownian movement in which particles less than 1 μm move was also observed. When this is stirred for a longer period of time, the particle size can be made uniform even further.

As described above, the likes of piezoelectric materials and oscillating bodies driven by electrostatic force are suitable as the foregoing oscillating body. For the manufacture of microcapsules, the foregoing piezoelectric materials and oscillating bodies driven by electrostatic force may be replaced with a micromotor drive source. This micromotor is capable of stirring the solution within the tank when driven by a stirrer such as a screw or rotating fan provided within the tank being connected to the motor axis. Since this will enable finer stirring at a high frequency, the manufacture of microcapsules can be efficiently conducted with the same principle as described above. Further, by simultaneously employing the oscillation of the piezoelectric material or oscillating body driven with electrostatic force and the stirring of the micromotor drive source, further efficient manufacture is possible. Moreover, by converting the rotating motion of the micromotor drive source into a piston motion, oscillation motion similar to the piezoelectric material or oscillating body driven with electrostatic force can be realized.

Next, discharging of droplets containing microcapsules is now explained with reference to FIG. 1.

Foremost, as shown in FIG. 1, in a normal state, the tip of the droplet at the discharging hole 13 is stable and still. When the oscillating body 12 oscillates at a relatively low frequency in which the solution 16 is able to follow suit, pressure is applied to the solution 16 in forward and reverse, the solution conducts a reciprocating movement (oscillation) within the liquid path of the discharging hole 13 only in a moving distance corresponding to the vibrational amplitude, and a portion thereof is discharged outside. When the oscillation frequency of the oscillating body 12 is a high oscillation frequency in an ultrasonic range (corresponds to oscillation frequency f1), the movement of the solution 16 will not be able to follow the oscillating body 12 due to the delay in response caused by the viscosity of the solution 16 itself and the friction or viscosity between the solution and inner wall of the discharging hole 13, and the moving distance of the tip of the liquid will become shorter. The solution will not be able to pass through the liquid path of the nozzle 13, and will not be discharged outside. This is the qualitative principle for the solution being discharged with the low oscillation frequency f2. When the oscillation frequency f2 is made to be even lower, the moving distance will become longer, and the amount of liquid to be discharged will increase.

Next, the oscillation frequency of the oscillating body, reaction rate, and discharging speed of the liquid from the discharging hole according to the present invention are explained further with reference to the graph depicted in FIG. 5.

The horizontal axis in FIG. 5 is the oscillation frequency (Hz), the vertical axis on the left side of FIG. 5 shows the emulsifying capacity, and the vertical axis on the right side shows the discharging speed (ml/min).

The emulsifying capacity for micro-encapsulation is higher in a high oscillation frequency of an ultrasonic range. The oscillation frequency f1 is set within the high oscillation frequency range of this emulsifying capacity. The oscillation frequency f1 optimum for this emulsification will vary depending on parameters such as the size of microcapsules, capacity of the container, vibrational energy, types of the respective solvents, temperature, and so on.

Here, when there is no margin in relation to the variation in the oscillation frequency between the oscillation frequency f1 suitable for micro-encapsulation (or emulsification) and the maximum value f2max of the oscillation frequency f2 necessary for the discharge, leakage may occur during micro-encapsulation with the oscillation frequency f1. Thus, it is necessary to broaden this margin via optimization or the like of the shape of the discharging hole 13.

As one method of broadening the margin, the internal pressure, which is the negative pressure inside the tank of FIG. 1, can be controlled. The tank 11 is a compression chamber for discharging droplets. In order to discharge the solution inside the tank, the negative pressure adjustment means 15 sets the internal pressure of the tank 11 slightly lower than the atmospheric pressure, and leakage is thereby prevented. The negative pressure for enabling micro-encapsulation is controlled to be higher in the negative direction in comparison to the negative pressure for enabling the discharge, and the margin in relation to the leakage upon micro-encapsulation is broadened even further. This negative pressure adjustment means 15, for instance, may employ a diaphragm mechanism. In other words, a part of the inside wall of the tank is made to be an elastic wall, and the thrust of the gauge pressing this elastic wall is controlled with gauge control adjustment. As a result of performing this positional adjustment with a structure of electrical-mechanical conversion, the control device not shown will be able to perform control so as to enable the optimum pressure during micro-encapsulation and discharge, respectively.

According to the first embodiment described above, microcapsules of a desired particle size and of a desired type, as appropriate, may be discharged to the target spot immediately after the manufacture thereof. Microcapsules can be discharged in a new state without any deterioration of the microcapsules; in other words, in a state of favorable dispersibility and homogeneity, and of high quality. Here, the control of particle size, for example, can be achieved by setting other parameters such as the vibrational amplitude and container capacity to a specific value, and changing the oscillation frequency f1 to an oscillation frequency corresponding to the particle size. Data sought prepared by experiments and so on in advance may be formed into a database and utilize.

Next, application of the first embodiment to the inkjet (droplet discharging) method is explained.

As a specific example of a device structure of the droplet discharging device having as its basic structure the tank 11, oscillating body 12 and discharging hole 13 described above, for example, this may be applied to the inkjet head of an inkjet system, which is a representative technology of a paper printing method.

The following two useful advantages can be obtained through such application in the inkjet head.

Advantage 1: The use of an inkjet head will enable the microcapsules to be discharged to the target position accurately, and precisely for only the required amount. In addition, rapid sequential discharging to a plurality of positions will be possible. For example, discharge of microcapsules to the target body can be conducted with the same positional accuracy as with the application of high quality color images on to paper with the inkjet method. Thus, mask-less and highly precise pattering application can be implemented speedily by applying the present invention to the manufacturing process such as microfabrication employing semiconductors, liquid crystal panels and other semiconductor processes.

In particular, this advantage is significant when the present invention is employed in the field of micro machines. As an example, the present invention may be employed for the local selective etching or the like of micro machines as a fully automatic pinpoint sequential discharging of drug solutions to the target. The application of microcapsules with the inkjet system is effective such as when it is desirable to slightly postpone the etching timing; that is, when it is desirable to perform etching a certain period of time after the application.

Advantage 2: Since it is easy to exchange the type of microcapsules when using an inkjet head, a plurality of types of microcapsules can be selectively applied to a plurality of spots speedily. The types of microcapsules can be exchanged easily by changing the inkjet head itself or changing the storage tank cartridge (this is the same as the conventional method of color printers which automatically change the ink color). As a result, a plurality of types of microcapsules can be speedily fed to the necessary targets, respectively.

Microcapsules may be employed in the centralized control automatic treatment for surgery or the like which requires a special technique of feeding a plurality of types of medicine to a plurality of prescribed affected areas during treatment, or for the automation or speedup of pharmaceutical preparations by pharmacists. The droplet discharging device of the present invention may be used in the automated pharmaceutical preparation manufacturing process of pharmaceutical companies, or employed in the field of biotechnology (speedup of bio experiments to be implemented simultaneously in a plurality of standards), or applied to the fully automated makeup application system that is programmed to match the face of each individual.

(Second Embodiment)

Figure 2:
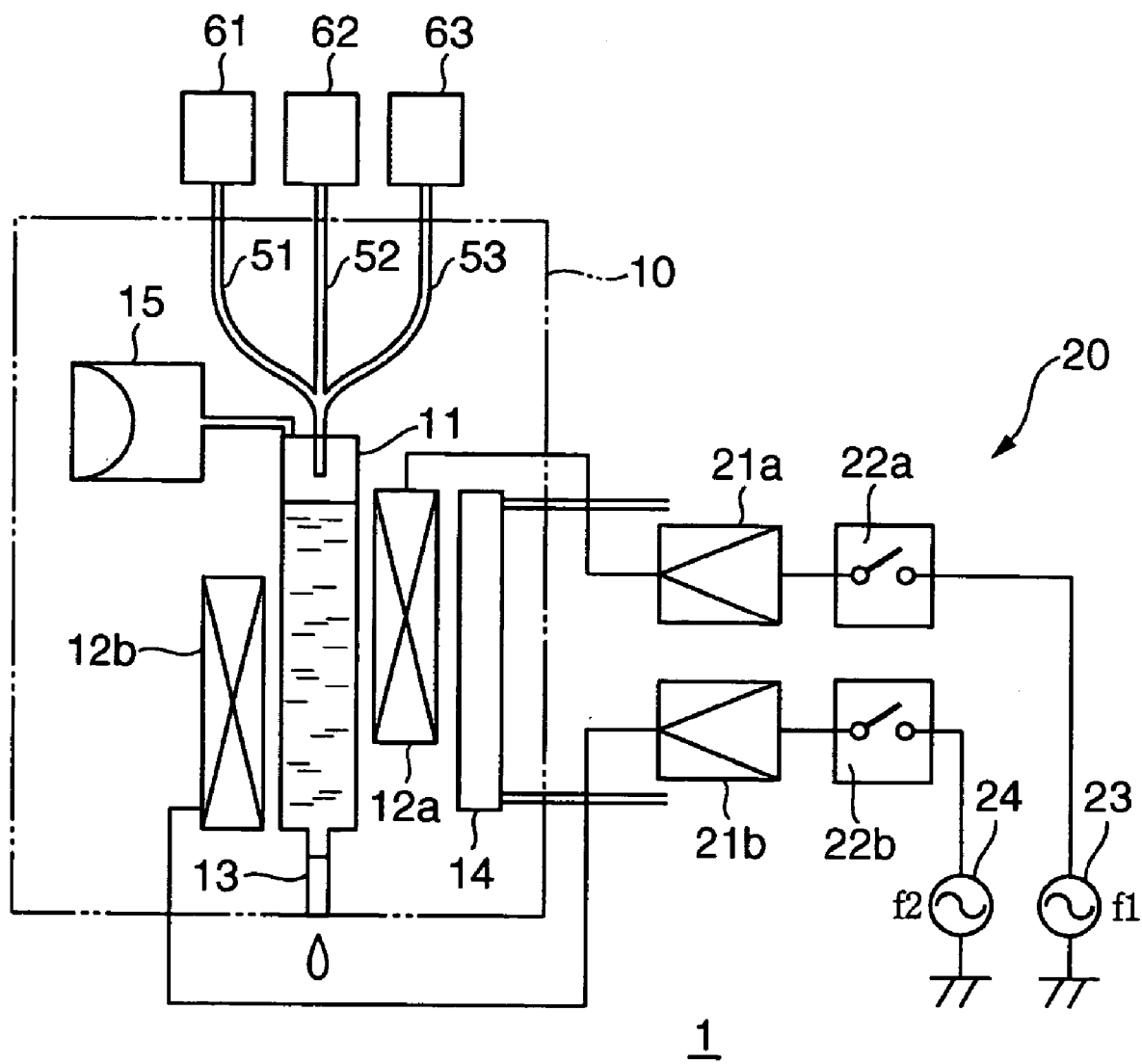
FIG. 2 is an explanatory diagram showing the droplet discharging device according to the second embodiment of the present invention.

The droplet discharging device according to the second embodiment of the present invention is now explained with reference to the explanatory diagram shown in FIG. 2. The components illustrated in FIG. 2 that correspond to those shown in FIG. 1 are given the same reference numerals, and the explanation of such components has been omitted.

In this example, two oscillating bodies are provided. The first oscillating body 12a is composed to be subject to the application of an electronic signal frequency f1. As a result, the first oscillating body 12a only needs to oscillate at its unique oscillation frequency f1, and can be made the oscillating body dedicated to the manufacture of microcapsules. Further, the second oscillating body 12b is composed to be subject to the application of an electronic signal frequency f2. As a result, the second oscillating body 12b only needs to oscillate at its unique oscillation frequency f2, and can be made the oscillating body dedicated to the discharge of microcapsules. The method of switching the oscillation frequency to the tank 11 is to switch the on/off of the respective frequency signal supply sources 23 and 24 of the first oscillating body 12a and second oscillating body 12b.

According to this structure, similar to the first embodiment, microcapsules can be obtained, and, since the frequencies to be used are divided into their respective roles per oscillating body, optimum oscillating body parameters can be set to the respective unique oscillation frequencies, and an oscillating body having a higher energy and higher efficiency can be provided.

Incidentally, of the two oscillating bodies described above, the oscillating body 12b (or oscillating bodies 12a and 12b) may be operated with the frequency f1 and f2, and, upon micro-encapsulation, the oscillating bodies 12a and 12b may perform micro-encapsulation of the materials stored inside by jointly operating in combination. In the foregoing case, the shortening of the time required for micro-encapsulation can be expected.

(Third Embodiment)

Figure 3:
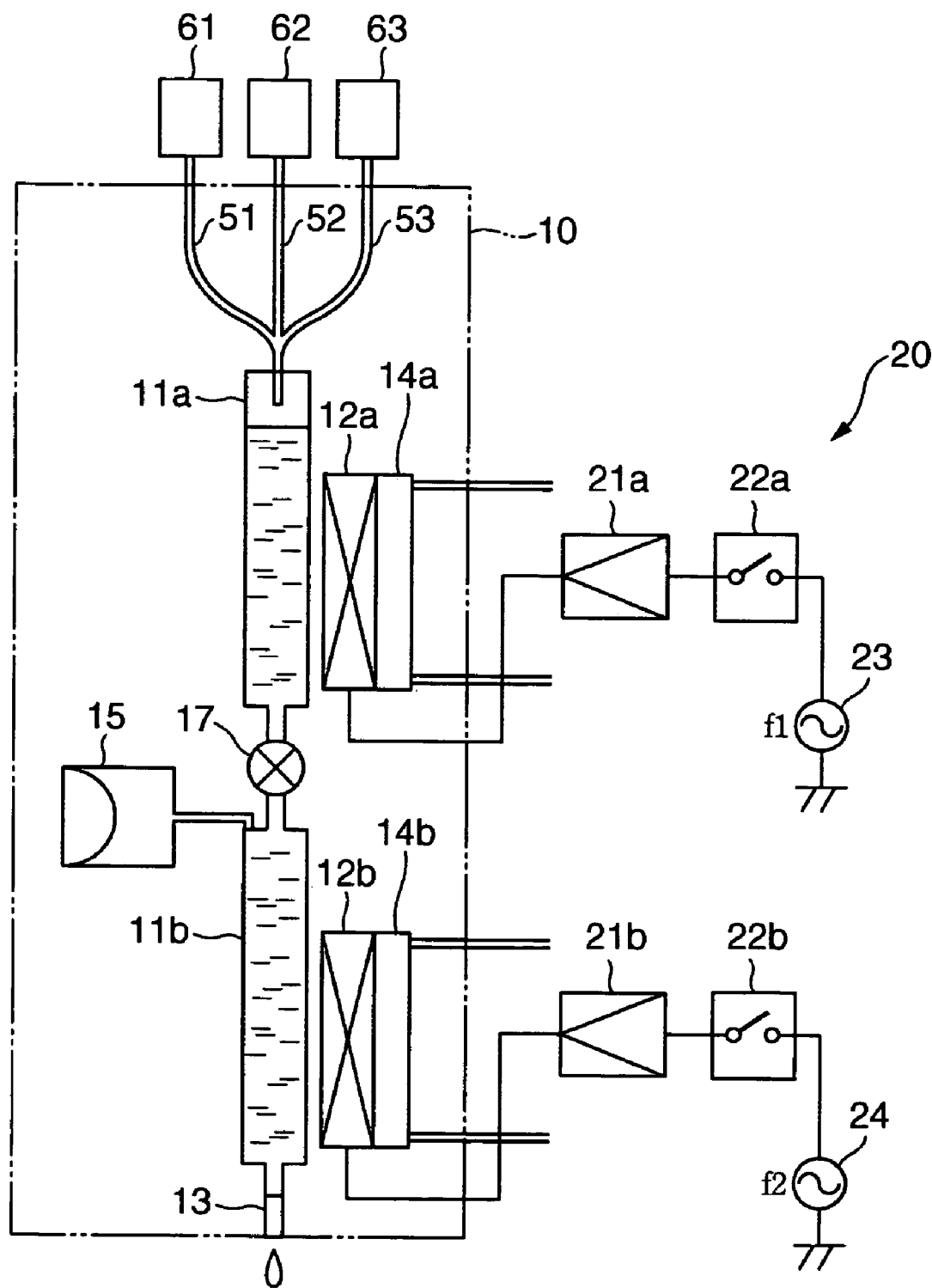
FIG. 3 is an explanatory diagram showing the droplet discharging device according to the third embodiment of the present invention.

The droplet discharging device according to the third embodiment of the present invention is now explained with reference to the explanatory diagram shown in FIG. 3. The components illustrated in FIG. 3 that correspond to those shown in FIG. 2 are given the same reference numerals, and the explanation of such components has been omitted.

Whereas the first and second embodiments manufactured and discharged microcapsules with a single tank, the third embodiment is characterized in having two (a plurality on tanks and separately performing the manufacture and discharge of microcapsules with the oscillating bodies provided respectively to such tanks. The first oscillating body 12a for manufacturing microcapsules is disposed on the sidewall of the tank 11a. The tank 11a stores a solution containing the core material and shell material as the precursor to become the microcapsule, and becomes a manufacturing tank for manufacturing microcapsules. The second oscillating body 12b for discharging microcapsules is disposed on the sidewall of the second tank 11b. The second tank 11b will become a tank dedicated to discharging microcapsules. The tank 11a and tank 11b are connected via a small backflow prevention or opening/closing valve for controlling the backflow prevention or movement of the solution. The valve 17 may also be externally controlled.

According to the foregoing structure, since the micro-encapsulation process and microcapsule discharging process can be performed separately, a time-sharing operation of the oscillating bodies 12, 12a and 12b as with embodiment 1 and 2 is not necessary. The manufacture and discharge of microcapsules will be performed in parallel, and continuous manufacture and continuous discharge of microcapsules can be conducted. Further, in the third embodiment, since the respective tanks clearly assume specific roles, for instance, there is no need to perform liquid oscillation with the f1 oscillation frequency upon manufacturing microcapsules in the second tank 11b for discharging microcapsules. Thus, leakage caused by the oscillation other than at the time of discharge can be minimized.

As described above, according to the embodiment of the present invention, microcapsules of a desired particle size (or droplet diameter) of a desired type can be selectively manufactured with high precision as necessary. Further, microcapsules can be discharged to the target spot of the target body immediately after the manufacture of such microcapsules. Microcapsules can be fed to the target spot with positional precision in a pinpoint manner in a state where the microcapsules are of favorable dispersivity and evenness, and of high quality. Since the particle size of the microcapsules are uniform, clogging of the discharging hole will not occur easily.

Moreover, since encapsulation can be consecutively performed only in a hermetical environment, after manufacturing the microcapsules in the storage tank, such microcapsules can be discharged without being exposed to the atmosphere. Thus, even if the microcapsules that become oxidized or otherwise deteriorated when subject to the atmosphere are used, such microcapsules may be fed to a prescribed target in a state without any deterioration in quality.

The droplet discharging device and manufacturing method of microcapsules according to the present invention described above may be applied to various fields such as DDS (drug delivery system), chemical field of fragrant materials, stable discharge of minute amounts of droplets of microcapsules for bio experiments or production to prescribed locations, biological samples such as artificial cells, display devices such as liquid crystals, digital paper, electrophoresis and so on. Further, during the foregoing use, since only a required amount of microcapsules can be manufactured in the tank and discharged thereafter on a case-by-case basis, wasteful drug solutions can be avoided.

What is claimed is:

1. A discharging device performing a micro-encapsulation process and a discharging process, comprising:
    an oscillating body that generates a first vibrational energy of a first frequency in the micro-encapsulation process and generates a second vibrational energy of a second frequency in the discharging process, a core material and a shell material being formed to a microcapsule in the micro-encapsulation process, the microcapsule being discharged in the discharging process, and the second frequency being lower than the first frequency.

2. The discharging device according to claim 1, the oscillating body including a piezoelectric material.

3. The discharging device according to claim 1, the first frequency being an ultrasonic frequency of an inaudible range.

4. The discharging device according to claim 1, further comprising:
    a chamber that holds a liquid material, the liquid material including the core material and the shell material, the oscillating body being disposed on the chamber; and
    a discharging hole that is connected to the chamber, the chamber discharging the microcapsule in the discharging process through the discharging hole.

5. The discharging device according to claim 4, further comprising:
    a cooling means that is disposed on at least one of the oscillating body and the chamber.

6. A discharging device performing a micro-encapsulation process and a discharging process, comprising:
    a first oscillating body that generates a first vibrational energy of a first frequency in the micro-encapsulation process, a core material and a shell material being formed to a microcapsule in the micro-encapsulation process; and
    a second oscillating body that generates a second vibrational energy of a second frequency in the discharging process, the microcapsule being discharged in the discharging process, the second frequency being lower than the first frequency.

7. The discharging device according to claim 6, further comprising:
    a chamber that holds a liquid material, the liquid material including the core material and the shell material, the first oscillating body and the second oscillating body being disposed on the chamber; and
    a discharging hole that is connected to the chamber, the chamber discharging the microcapsule in the discharging process through the discharging hole.

8. A discharging device performing a micro-encapsulation process and a discharging process, comprising:
    a tank that stores a liquid material, the liqiuid material including a core material and a shell material, the core material and the shell material being formed to a microcapsule in the micro-encapsulation process;
    a discharging hole that connects to the tank, the tank discharging the liquid material in the discharging process; and
    a negative pressure adjustment means that connects to the tank, the negative pressure adjustment means setting a first pressure of the tank in the micro-encapsulation process and a second pressure of the tank in the discharging process, the first pressure being lower than the second pressure.

9. A method of discharging a microcapsule, the method comprising:
    generating a first vibrational energy of a first frequency to an oscillating body, a core material being encapsulated with a shell material by the first vibrational energy to form the microcapsule; and
    generating a second vibrational energy of a second frequency to the oscillating body to eject the microcapsule from a discharging hole,
    the second frequency being lower than the first frequency.

10. The method according to claim 9, further comprising:
providing a liquid material to a chamber, the liquid material including the core material and the shell material, the oscillating body being disposed on the chamber, and the discharging hole being connected to the chamber.

11. A method of discharging a microcapsule, the method comprising:
providing a first liquid material in a first chamber, the first liquid material including a core material and a shell material;
generating a first vibrational energy of a first frequency to a first oscillating body that is disposed on the first chamber, the core material being encapsulated with the shell material by the first vibrational energy to form the microcapsule;
providing a second liquid material in a second chamber, the second liquid material including the microcapsule; and
generating a second vibrational energy of a second frequency to a second oscillating body to eject the microcapsule from a discharging hole that cormects the second chamber, the second oscillating body being disposed on the second chamber.

* * * * *